United States Patent [19]

Cook

[11] 4,046,156
[45] Sept. 6, 1977

[54] EXPLOSION DISCHARGE VALVE

[75] Inventor: Kenneth C. Cook, Walnut Creek, Calif.

[73] Assignee: Systron-Donner Corporation, Berkeley, Calif.

[21] Appl. No.: 637,582

[22] Filed: Dec. 4, 1975

[51] Int. Cl.² .......................................... F16K 17/40
[52] U.S. Cl. .................................. 137/68 A; 169/28; 220/89 A; 220/261; 222/5
[58] Field of Search ........................... 137/68 R–71; 220/89 A, 261; 169/28; 222/5

[56] References Cited

U.S. PATENT DOCUMENTS

| 1,951,897 | 3/1934 | Binckley | 220/89 A |
| 2,408,774 | 10/1946 | Goddard et al. | 137/68 A X |
| 2,417,082 | 3/1947 | Mapes et al. | 169/28 |
| 3,467,120 | 9/1969 | Hill et al. | 220/89 A X |
| 3,693,691 | 9/1972 | Summers | 137/68 R X |
| 3,762,479 | 10/1973 | Fike et al. | 169/28 |

Primary Examiner—Martin P. Schwadron
Assistant Examiner—Richard Gerard
Attorney, Agent, or Firm—Flehr, Hohbach, Test, Albritton & Herbert

[57] ABSTRACT

Valve apparatus is disclosed for discharging pressurized fire extinguisher fluid from a container. The valve includes a diaphragm which is removably mounted within a two-part housing to facilitate field replacement. The diaphragm is formed with a semi-spherical shell which is mounted across a passage in the housing with a concave side of the shell facing the pressurized fluid. The shell is fabricated of a metal which is prestressed so that the diaphragm ruptures above a predetermined fluid pressure for relieving over-pressure from the container. An annular rim of the diaphragm includes a ductile metal ring which is compressed between the housing parts into fluid sealing relationship with an annular knife edge seal. A squib cartridge is mounted in the housing to rupture the diaphragm and permit the fluid to discharge through the passage. A screen is mounted in the passage to screen out fragments of the ruptured diaphragm from the flow stream.

4 Claims, 5 Drawing Figures

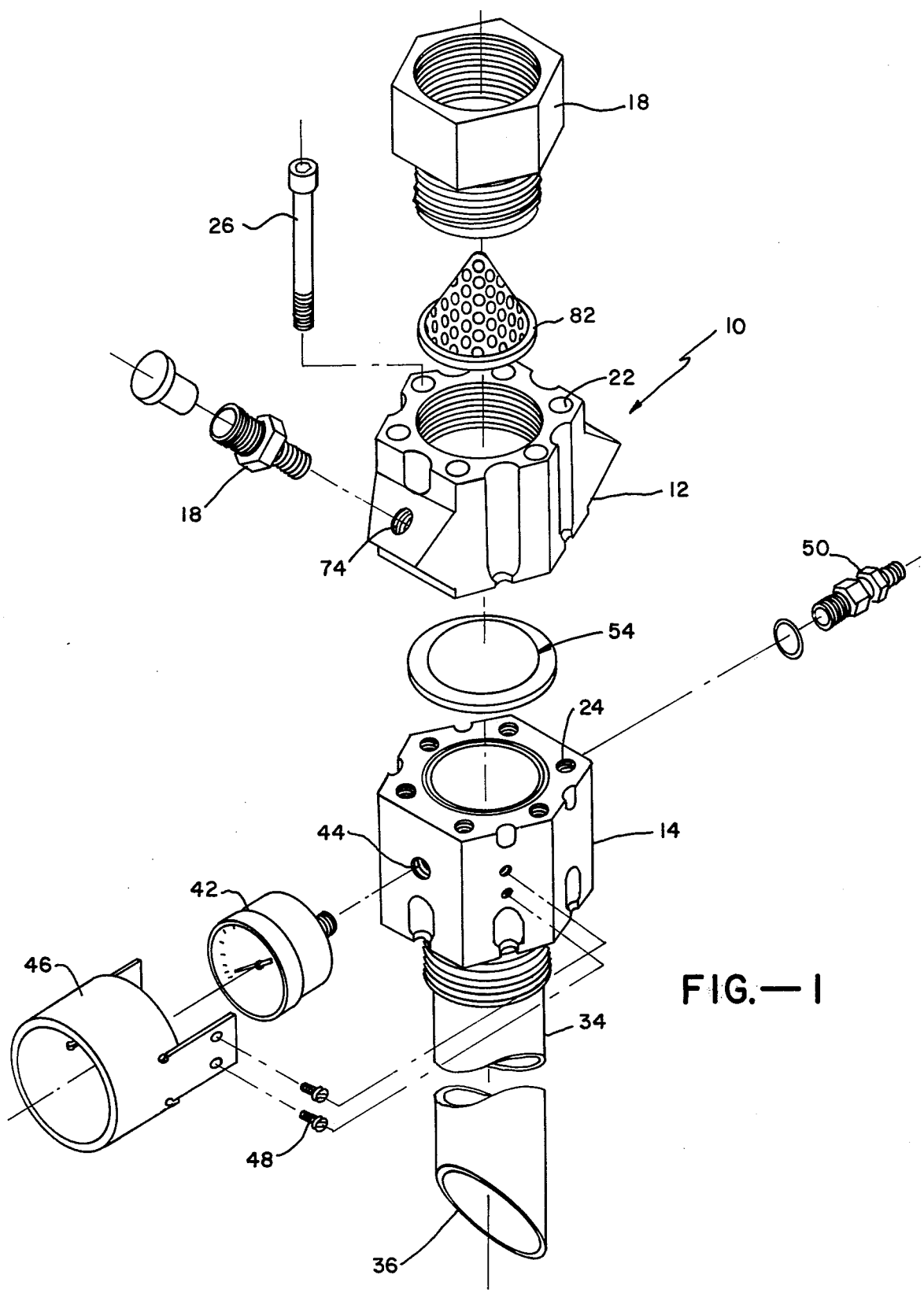
FIG.—1

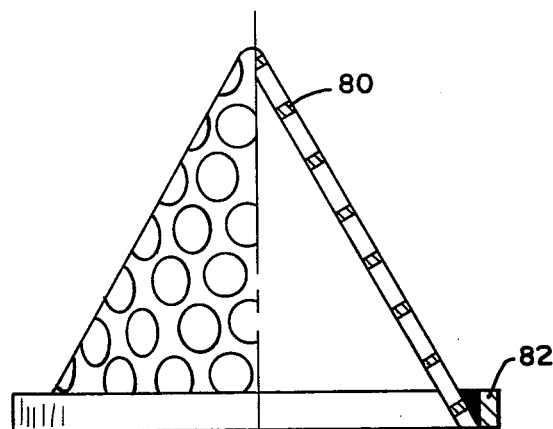
FIG.—5
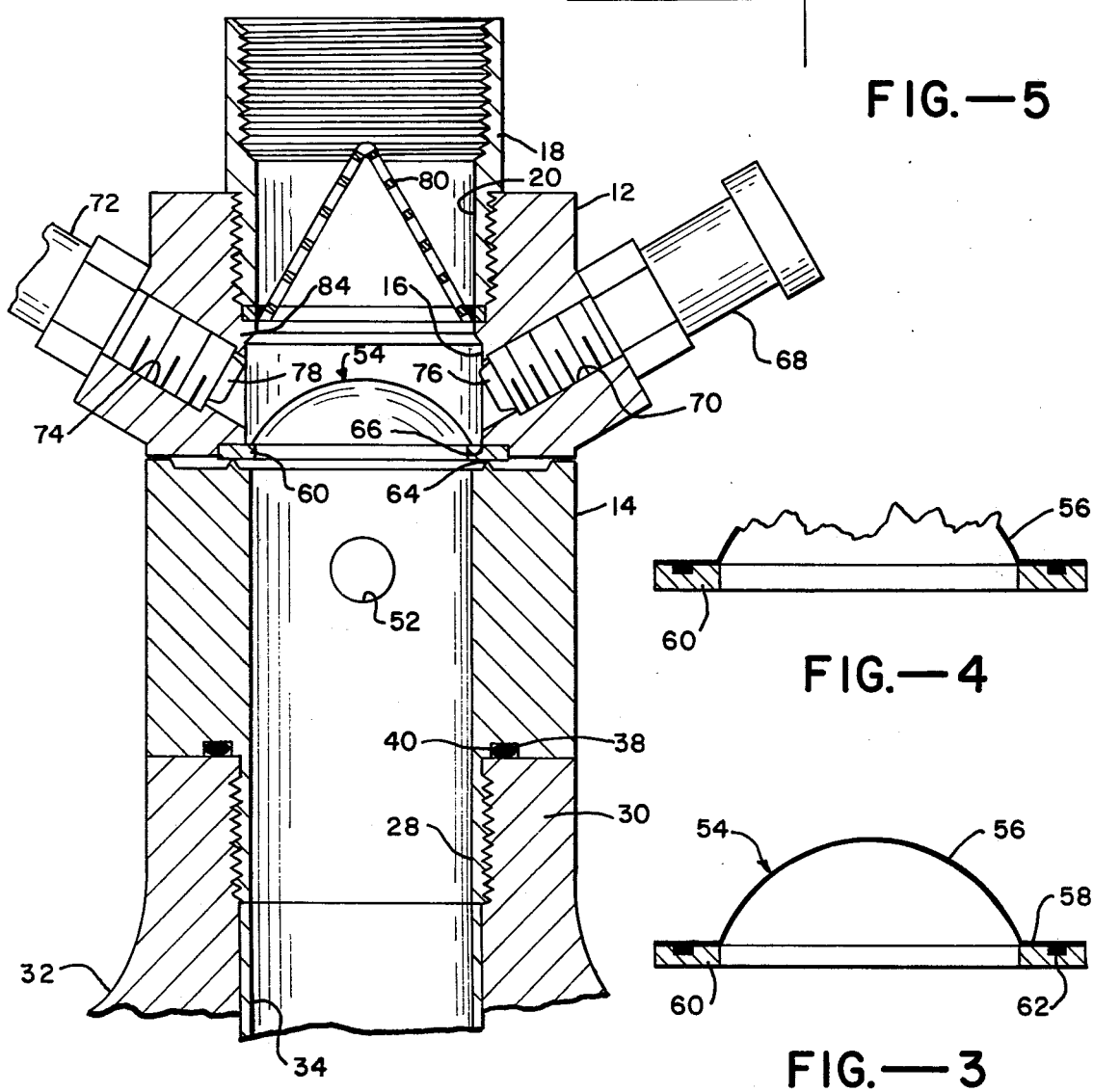
FIG.—4
FIG.—3
FIG.—2

EXPLOSION DISCHARGE VALVE

BACKGROUND OF THE INVENTION

This invention relates in general to fire extinguisher systems, and more particularly relates to fire extinguisher systems which provide rapid discharge of fire extinguisher fluids hermetically sealed under gas pressure within containers.

Fire extinguisher systems have heretofore been provided in which the contents of pressurized fire extinguisher containers are discharged by rupturing a closure disc to rapidly direct the fire extinguisher fluids to fire zones. Certain of these systems employ a filler port which is sealed after the fire extinguisher fluid is charged into the container, a safety relief valve which ruptures above a predetermined container pressure, and an explosive charge which ruptures a closure disc for discharge. It is conventional in these valves to employ a closure disc which is sealed within the valve by means such as welding.

In fire extinguisher systems of the type described it has not been feasible to recharge the container in the field after operation. It has heretofore been necessary to bring the entire valve back to a shop for removing and replacing the ruptured closure disc and for refilling the container. Moreover, the requirement of providing an over-pressure relief valve in addition to the closure disc in the discharge valve adds to the design complexity and cost of the system. Accordingly, the need has been recognized for a fire extinguisher system which will obviate the disadvantages and limitations of existing systems.

OBJECTS AND SUMMARY OF THE INVENTION

It is a general object of the invention to provide new and improved valve apparatus for discharging pressurized fire extinguisher fluid from a container.

Another object is to provide a valve of the type described which employs a disc which hermetically seals fluid pressure within the container and which at the same time is easily removed to permit field replacement following operation of the valve.

Another object is to provide a valve of the type described which incorporates a closure diaphragm serving the dual function of over-pressure relief as well as selective discharge by rupture from an explosive charge.

Another object is to provide a valve of the type described in which a semi-spherical diaphragm having an annular rim of a ductile metal is hermetically sealed by an annular knife edge to normally occlude the flow passage through the valve whereby following rupture of the diaphragm and discharge of the fluid the diaphragm can be easily removed and replaced in the field.

The invention in summary includes a valve housing formed in two parts which are mounted about a diaphragm normally occluding a flow passage communicating with pressurized fire extinguisher fluid in a container. The diaphragm is formed with a thin-walled semi-spherical center portion which is pre-stressed to achieve a predetermined rupture strength limit so that the diaphragm can rupture when fluid pressure exceeds the limit and thereby functions as a safety relief valve for the container. An annular rim of the diaphragm includes a ring of ductile metal which is removably seated between the housing parts and is compressed against a knife edge to form an hermetical seal. A squib cartridge is mounted in the housing to direct an explosive charge and metal cap from the cartrige against the convex side of the diaphragm to rupture the diaphragm and discharge fluid from the container along the passage to a fire zone. A screen is mounted in the valve housing downstream of the diaphragm to screen out fragments of the ruptured diaphragm.

The foregoing and additional objects and features of the invention will become apparent from the following description in which the preferred embodiments have been set forth in detail in conjunction with the accompanying drawings.

BRIEF DESCRIPTION OF THE DRAWINGS

FIG. 1 is a perspective exploded view of the valve apparatus of the invention.

FIG. 2 is an axial section view of the valve of FIG. 1 shown in asembled relationship on the discharge port of a fire extinguisher container.

FIG. 3 is an axial section view of an intact ruptured diaphragm used in the valve of FIG. 1.

FIG. 4 is a view similar to FIG. 3 showing the diaphragm after rupture.

FIG. 5 is side elevational view partly in section of the screen used in the valve of FIG. 1.

DESCRIPTION OF THE PREFERRED EMBODIMENTS

In the drawings FIGS. 1 and 2 illustrated generally at 10 a preferred embodiment of the explosion discharge valve of the invention. Valve 10 includes a two-part housing comprising an upper body 12 and a lower manifold 14. Valve body 12 is formed with a generally hexagonal outer configuration and a circular axial bore 16 which is internally threaded at its upper end for connection with an adapter fitting 18. Adapter fitting 18 in turn has an upper hexagonal shoulder for applying a suitable tool or wrench, and the fitting is formed with an axial bore 20 which is internally threaded at its upper end for connection with suitable plumbing, not shown, arranged to direct the fire extinguisher fluid to one or more remote fire zones. A plurality, shown as six, of axially extending openings 22 are formed about the periphery of valve body 12, and an equivalent number of internally threaded holes 24 are formed in the upper end of manifold 14 in register with the openings. Six cap screws 26 are mounted through openings 22 and engage the threaded holes 24 for securing the valve body and manifold together.

Valve manifold 14 is formed with a reduced diameter externally threaded stub end 28 connected with internal threads formed in the circular discharge port 30 of a fire extinguisher container 32, which can be of a suitable configuration such as cylindrical or spherical. A hollow cylindrical dip tube 34 is secured onto the lower end of stub end 28 with the lower end of the dip tube being beveled at 36 for admitting fluid from the container into the dip tube and manifold. A suitable O-ring seal 38 is mounted within a groove 40 formed about the lower end of the manifold to create an hermetical seal between the manifold and container discharge port.

A suitable pressure gauge 42 is threadably connected to an opening 44 formed through one side of manifold 14 for providing visual indication of the pressure within the fire extinguisher container. A cylindrical guard 46 is mounted about the pressure gauge by suitable fasteners 48 secured to opposite sides of the manifold. As desired, the pressure gauge may be replaced by a suitable pressure switch, not shown, which provides pressure indication at a remote location through electrical leads. A suitable one-way flow fill port valve 50 is threadably mounted through an opening 52 formed in an opposite side of the manifold for purposes of filling the container with a charge of pressurized fire extinguisher fluid, such as bromochlorodifluromethane, together with a suitable pressurizing gas such as nitrogen. Typically the contents of the container are maintained under a pressure on the order of 600 p.s.i. As desired, a suitable leak detection gas, such as helium, can be added to the charge in the container.

A dual purpose replaceable diaphragm 54 is mounted between valve body 12 and manifold 14 for normally occluding thhe discharge flow passage through the valve. Diaphragm 54 includes a generally cup-shaped semi-spherical shell 56 with a flat annular outer rim 58. Preferably the shell is formed of a suitable high tensile strength material such as stainless steel which is prestressed by work hardening the metal so that the diaphragm has a predetermined rupture strength, preferably in the range of 1800 to 2000 p.s.i. In one specific application, given by way of example only, the diaphragm is fabricated from an initially flat disc of CRES 304 metal with a thickness of 0.010 inch. Hydraulic pressure of 1,800 p.s.i. is applied to the center portion of the disc causing it to deform and work harden into the illustrated cup-shaped configuration having a thickness of substantially 0.005 inch.

Diaphragm 54 includes a ring 60 of a suitable ductile metal such as copper. The top side of the copper ring is plated with a suitable material such as nickel or gold for corrosion protection, and the ring is secured to the lower surface of the rim 58 by means such as brazing. The brazing operation can be carried out by placing a suitable brazing material such as EASY-FLO No. 3 sold by Handy Harman Co. into a circular groove 62 formed in the upper side of the ring. The shell and ring are then placed in a furnace and heated so that the brazing material forms a secure bond between the two parts.

Diaphragm 54 is removably mounted in sealing relationship in the housing by means of an annular knife edge 64 formed about the upper end of manifold 14. The lower surface of the ring is positioned over the knie edge. an annular socket 66 formed about the lower end of valve body 12 seats over diaphragm rim 58, and as cap screws 26 are tightened down the diaphragm is compressed against the manifold so that the knife edge deforms a groove into the softer material of ring 60. An hermetical seal between the diaphragm and manifold is thereby formed for sealing the pressurized charge in the container, while at the same time the diaphragm can be easily removed for replacement by dismounting the valve body.

Explosive charge means is provided for rupturing diaphragm 54 when required to discharge the fire extinguisher container. This charge means includes a suitable squib cartridge 68 threadably mounted through an opening 70 formed in a side of the valve body. The axis of opening 70 is aligned at an angle on the order of 60° from the center line of the valve flow passage so that explosive discharge from the cartridge impinges upon the lower margin of the convex side of diaphragm. The cartridge 68 is activated by suitable means such as electrical current directed through leads, not shown, connected with a temperature sensor in the remote fire zone. An additional squib cartridge 72 is threadably mounted through an opening 74 formed in an opposite side of the body, and this cartridge is also aligned at substantially 60° from the flow passage so that its explosive discharge impacts against the lower margin of the diaphragm. Cartridge 72 is activated remotely by a suitable mechanical firing device, e.g. a manual pull cable, to provide safety override in case of malfunction of the electrically operated cartridge. Each of the squib cartridges includes a metal cap 76, 78 at their lower ends which form a part of the enclosures for the deflagrating charge material. Upon activation of the cartridges the rapidly exploding gases tear out and impel the metal caps with high force to impact upon and initially rupture the diaphragm. Immediately thereafter the rapidly discharging flow of high pressure fluid through the valve completes the rupture of the entire diaphragm in the manner illustrated in FIG. 4.

A screen structure is mounted in the flow passage downstream of the diaphragm for screening out fragments of the ruptured diaphragm from the discharging fluid. The screen structure comprises a perforated metal cone 80, FIG. 5, secured at its base by means such as brazing to a metal ring 82. An intrusive rim 84 is formed about bore 16 of the valve body, and screen ring 82 is sized to seat against the upper surface of this rim. Threading connection of adapter 18 into the valve body tightly captures the ring against the rim to hold the screen in place across the discharge flow path.

The use and operation of the explosive discharge valve is as follows. Valve manifold 14 with its dip tube 34 are threadably connected into the discharge port of the container. The lower surface of diaphragm ring 60 is placed on knife edge 64 and the valve body 12 is then mounted over the diaphragm and tightened down by the cap screws to form a tight seal about the diaphragm. Adapter 18 is then threaded into the upper end of the valve body and suitable plumbing is connected between the adapter and the remote fire zones, such as engine nacelles of an aircraft. The squib cartridges are threadably mounted into the valve body, with the cartridge 68 connected with a temperature sensor in the fire zone and the cartridge 72 connected with a pull cable for manual override. A charge of fire extinguisher fluid and pressurization gas is injected through fill port valve 50 into the container to a pressure of 600 p.s.i.

When a fire breaks out the remote temperature sensor energizes squib cartridge 68 which fires, directing an explosive charge against the diaphragm. The metal cap from the charge impinges upon and ruptures the lower side of the convex surface of the diaphragm. The rapid discharge of pressurized fluid from the container through the initilly ruptured portion of the diaphragm causes complete tearing of the metal shell with the fluid continuing through the valve along the plumbing to the fire zone. Metal fragments from the ruptured disc are screened out from the flow by screen 80. Should an over-pressure condition occur in the container for any reason the prestressed diaphragm will rupture outwardly and relieve the pressure through the valve passage.

Following discharge of the container, valve 10 can be reconditioned in the field for further operation by dismounting valve body 12 from the manifold. The ruptured diaphragm is removed and replaced by a new diaphragm, and the valve body is again mounted onto the manifold to seal the new diaphragm in place. The expended squib cartridge is removed and replaced, and an additional charge of fire extinguisher fluid and pressurization gas is injected through fill port valve 50 into the container.

While the foregoing embodiments are presently considered to be preferred it is understood that numerous variations and modifications may be made therein by those skilled in the art and it is intended to cover in the appended claims all such variations and modifications as fall within the true spirit and scope of the invention.

What is claimed is:

1. A valve for discharging pressurized fire extinguisher fluid from a container, including the combination of a valve housing formed with a passage communicating with the interior of the container, a diaphragm mounted in the housing across the passage, said diaphragm comprising a thin-walled cup-shaped center portion and an integral peripheral rim which includes a ring formed of a ductile metal, said center portion being positioned within the passage in a direction convex away from pressurized fluid of the container, means forming a hermetical seal about the rim for normally sealing fluid within the passage, said seal means comprising means in the housing forming an annular knife-shaped edge about the passage with the edge abutting the diaphragm rim on a side thereof which is normally exposed to pressurized fluid in the passage from the container, the housing including means for releasably urging the ring against the knife-shaped edge whereby the edge forms and seats into an annular groove in the metal of the ring and whereby the ring can be released for moving and replacing the diaphragm, and explosive charge means oriented toward the diaphragm center portion on the convex side thereof for rupturing the diaphragm and permitting discharge of fluid from the container along the passage.

2. A valve as in claim 1 in which the diaphragm center portion is formed of a high tensile strength metal for resisting fluid pressure in the passage on the concave side of the diaphragm, and with the metal of the center portion being pre-stressed whereby the center portion ruptures when said fluid pressure on the concave side exceeds a predetermined value for relieving over-pressure in the container.

3. A valve as in claim 1 in which the housing is formed with first and second sections; the first section having an end formed with an annular socket with the diaphragm rim seated in the socket, and fastener means for securing the first and second sections together whereby the socket compresses the diaphragm rim against the knife-shaped edge.

4. A valve as in claim 1 in which the cup-shaped center portion of the diaphragm is formed of work-hardened stainless steel having a rupture strength limit in the range of 1800 to 2000 p.s.i. whereby the diaphragm provides over-pressure relief of the container when the fluid pressure therein exceeds said limit for rupturing the diaphragm.

* * * * *